(12) United States Patent
Sahm et al.

(10) Patent No.: US 6,192,697 B1
(45) Date of Patent: Feb. 27, 2001

(54) SYSTEM AND METHOD FOR DETERMINING HEAT TRANSFER IN AN ENVIRONMENT

(75) Inventors: Michael K. Sahm, Annendale; David G. Wardle, Bridgewater, both of NJ (US); Brian Goodwin, Ferndale, PA (US)

(73) Assignee: The BOC Group, Inc., New Providence, NJ (US)

( * ) Notice: Subject to any disclaimer, the term of this patent is extended or adjusted under 35 U.S.C. 154(b) by 0 days.

(21) Appl. No.: 09/282,373

(22) Filed: Mar. 31, 1999

(51) Int. Cl.[7] ............................. G01K 17/00; G01N 25/20
(52) U.S. Cl. .............................. 62/223; 236/1 R; 374/29
(58) Field of Search ...................... 62/223, 502; 236/1 R; 374/29, 43, 44

(56) References Cited

U.S. PATENT DOCUMENTS

| | | | |
|---|---|---|---|
| 4,522,512 | * | 6/1985 | Atkins ..................................... 374/29 |
| 5,921,090 | * | 7/1999 | Jurewicz et al. ....................... 62/50.2 |
| 5,946,922 | * | 9/1999 | Viard et al. ............................ 62/50.2 |

FOREIGN PATENT DOCUMENTS

| | | |
|---|---|---|
| 0 279 865 | 8/1988 | (EP) . |
| 0517 496A | 12/1992 | (EP) . |
| 2 265 460 | 9/1993 | (GB) . |

* cited by examiner

Primary Examiner—William Wayner
(74) Attorney, Agent, or Firm—Salvatore P. Pace

(57) ABSTRACT

Systems and methods are disclosed for determining heat transfer in an environment. In one system, heat transfer is determined with a probe including at least one element, a power supply, an amplifier, a temperature monitor, a timing structure, and a system controller. In another system, heat transfer is determined with a temperature sampler. In yet another system, the heat transfer rate is controlled in at least a partially closed environment. The disclosed methods include a method for calculating heat transfer from a first predetermined temperature, a second predetermined temperature, measured time and temperature of the environment. In another method, heat transfer is calculated from a first determined temperature, a second measured temperature, a predetermined period of time, and temperature of the environment.

57 Claims, 5 Drawing Sheets

SYSTEM AND METHOD FOR DETERMINING HEAT TRANSFER IN AN ENVIRONMENT

BACKGROUND OF THE INVENTION

1. Field of the Invention

The present invention relates to a heat transfer measurement method and system. More particularly, the present invention relates to a method and system for measuring heat transfer in a transient environment, using a hybrid of active and passive techniques.

2. Description of Related Art

Though temperature measurements have long been used to study the flow of thermal energy in the design and optimization of heating and cooling systems, temperature is only a secondary variable. A complete understanding of the heat transfer profile in an environment requires accurate measurement of the heat transfer rate. However, due to the complex nature of thermal energy flow, the heat transfer rate is an extremely difficult quantity to accurately measure. Generally, heat transfer measurement techniques are known in the art that employ either an active or passive technique, but not both.

The active technique involves measuring the amount of power required to maintain either a constant temperature or power output for a surface in a given environment. The heat transfer rate can be calculated by determining the temperature of the surface, the temperature in the environment, and the amount of power provided to the surface. However, this technique has some significant shortcomings. In particular, the active approach requires a large and bulky power supply to maintain constant temperature or power output of the surface under extreme temperature conditions. In addition, this technique requires a complex and expensive temperature controller to assure a constant temperature of the surface in the transient environment.

The other method known in the art is the passive approach. This method involves initially altering the temperature of a surface and allowing the surface to transiently equilibrate. Using the passive technique, the heat transfer rate can be calculated with knowledge of the initial and final temperatures of the surface, the environment temperature, and the time or history between the initial and final temperatures (i.e., the time for the temperature of the surface to equilibrate with the temperature of the environment). Although the passive technique does not require a large power source, it provides limited data acquisition time and can result in difficult quantitative interpretation.

In view of the foregoing, there is a need for an improved method and system for measuring heat transfer in an environment.

SUMMARY OF THE INVENTION

Accordingly, the present invention is directed to a method and system that substantially obviate one or more of the limitations of the related art. To achieve these and other advantages, and in accordance with the purpose of the invention, as embodied and broadly described herein, the invention includes a system comprising a probe including at least one element provided with at least one electrical lead (i.e., connector) extending from the probe. The at least one element is configured to change temperature of the element and to determine temperature of the element. The system also includes a power supply for providing electrical power to the element. In addition, an amplifier may be provided for amplifying a temperature signal received from the element. The system further includes a temperature monitor for receiving amplified temperature signals from the amplifier and for determining whether the temperature of the element corresponds to a first predetermined temperature or a second predetermined temperature. Additionally, a timing structure is provided for measuring the time elapsed from when the element reaches the first predetermined temperature to when the element reaches the second predetermined temperature. The system also includes a system controller for controlling the power supply and timing structure. The system controller receives signals from the timing structure and provides signals to the timing structure and the power supply.

In another aspect, the system for determining heat transfer in an environment includes a temperature sampler for receiving temperature signals from the amplifier and for measuring the temperature of the element at the beginning and the end of a predetermined period of time. Additionally, a system controller is provided for controlling the power supply and the temperature sampler. The system controller provides signals to the power supply and the temperature sampler and receives signals from the temperature sampler.

In a further aspect, the present invention includes a method for determining heat transfer in an environment with a probe including at least one element. The method includes determining temperature of the environment. Additionally, the method includes changing temperature of the element to increase the difference between the temperature of the element and the temperature of the environment. After the changing of the temperature, a first temperature of the element is determined. Next, the element is allowed to equilibrate (i.e., cool or heat) for a predetermined period of time towards the temperature of the environment. After the predetermined period of time, a second temperature of the element is measured. Finally, the heat transfer rate to or from the environment is calculated based on the first temperature, the second temperature, temperature in the environment, and the predetermined period of time.

In another aspect, the method includes changing the temperature of the element so that the element reaches a first predetermined temperature different from temperature of the environment. When the temperature of the element is changed, the first predetermined temperature is sensed. Next, the temperature of the element is allowed to equilibrate (i.e., cool or heat) towards the temperature of the environment. While the element is equilibrating (i.e., cooling or heating), a second predetermined temperature is sensed. A measurement is made of the time elapsed from when the first predetermined temperature is sensed to when the second predetermined temperature is sensed. Finally, the heat transfer in the environment is calculated based on the first predetermined temperature, the second predetermined temperature, temperature of the environment, and the measured time.

In yet another aspect, the probe includes one element configured to change temperature of the element and to determine temperature of the element.

In another aspect, the probe includes both a first element configured to change temperature and to measure temperature of the first element and a second element configured to measure temperature of the environment.

In another aspect, the invention includes a system for controlling the heat transfer rate in a climate controlled environment. The system includes at least one wall forming at least a partially closed environment. Additionally, a climate control sub-system is provided for changing temperature in the environment. The system also includes a heat transfer rate determining subsystem for determining heat transfer rate in the environment. The heat transfer rate determining sub-system includes at least one of the systems for determining heat transfer discussed above. Moreover, the system includes a climate controller for controlling the climate control sub-system. The climate controller receives input from the heat transfer rate determining sub-system and is configured to provide a predetermined heat transfer profile in the environment.

It is to be understood that the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
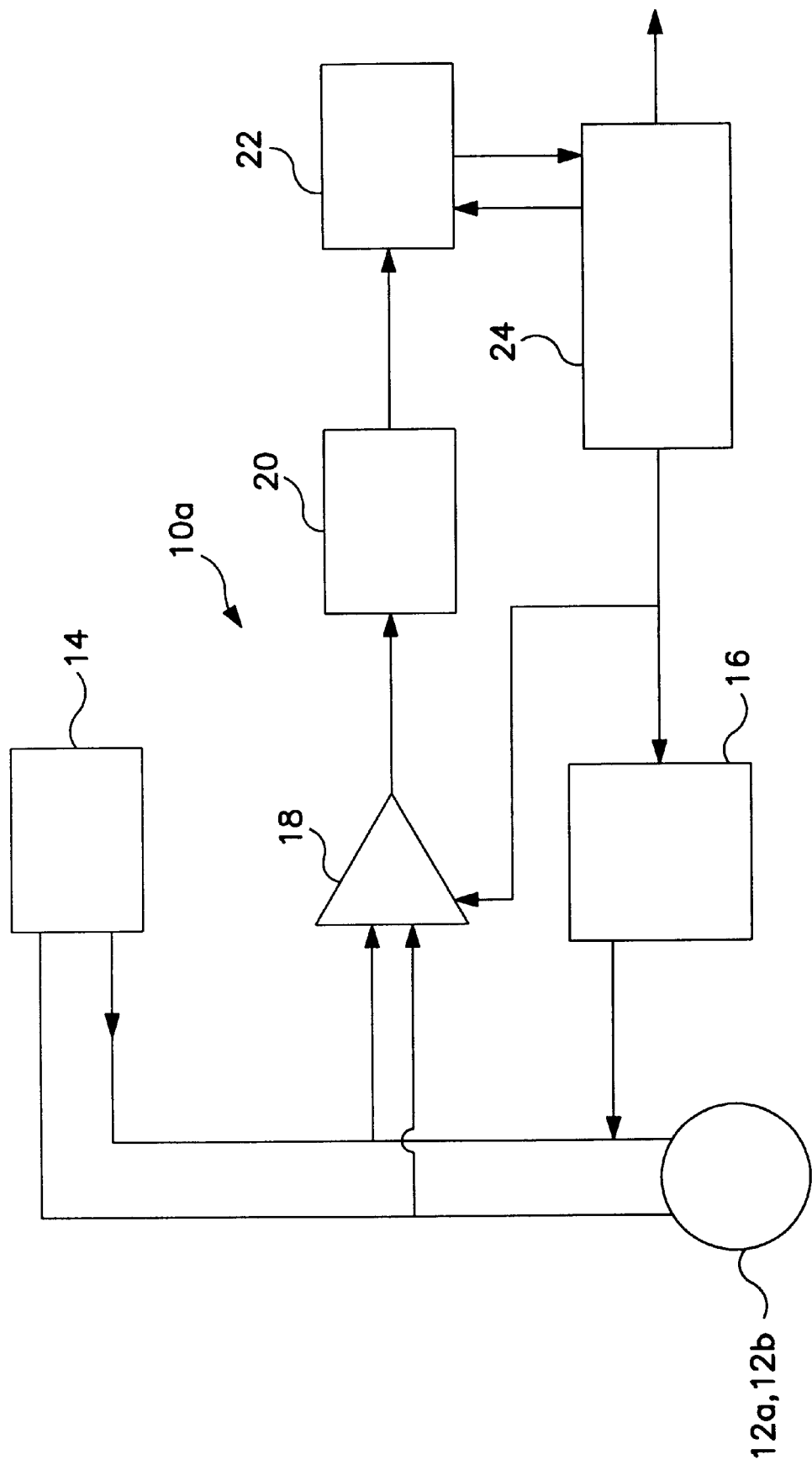
FIG. 1 is a schematic view of a system according to a first embodiment of the invention for determining heat transfer in an environment.

Reference will now be made in detail to the present preferred embodiments of the invention, examples of which are illustrated in the accompanying drawings. Wherever possible, the same reference numbers are used in the drawings and the description to refer to the same or like parts, and the same reference numerals with different alphabetical suffixes are used to refer to similar parts.

In accordance with the invention, there is provided a system for determining heat transfer in an environment including a probe having at least one element, an electrical lead (i.e., connector) extending from the probe, a power supply, an amplifier, a temperature monitor, and a timing structure. FIG. 1 shows a schematic representation of a first embodiment of a system 10a in accordance with the present invention. As shown in FIG. 1, the system 10a includes a probe 12a or 12b, a first power supply 14, a second power supply 16, an amplifier 18, a temperature monitor 20, a timing structure 22, and a system controller 24.

Figure 2:
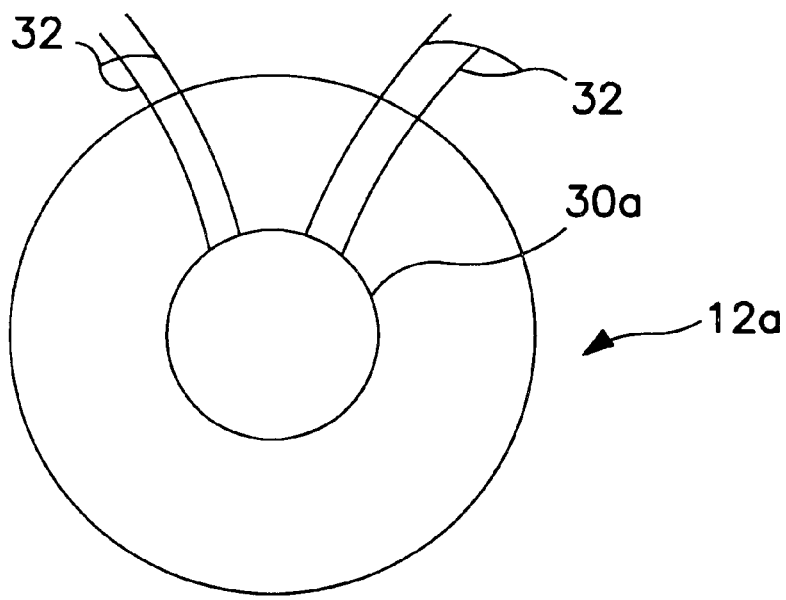
FIG. 2 is a schematic view of an embodiment of a probe including a single element for use with the system of FIG. 1.
Figure 3:
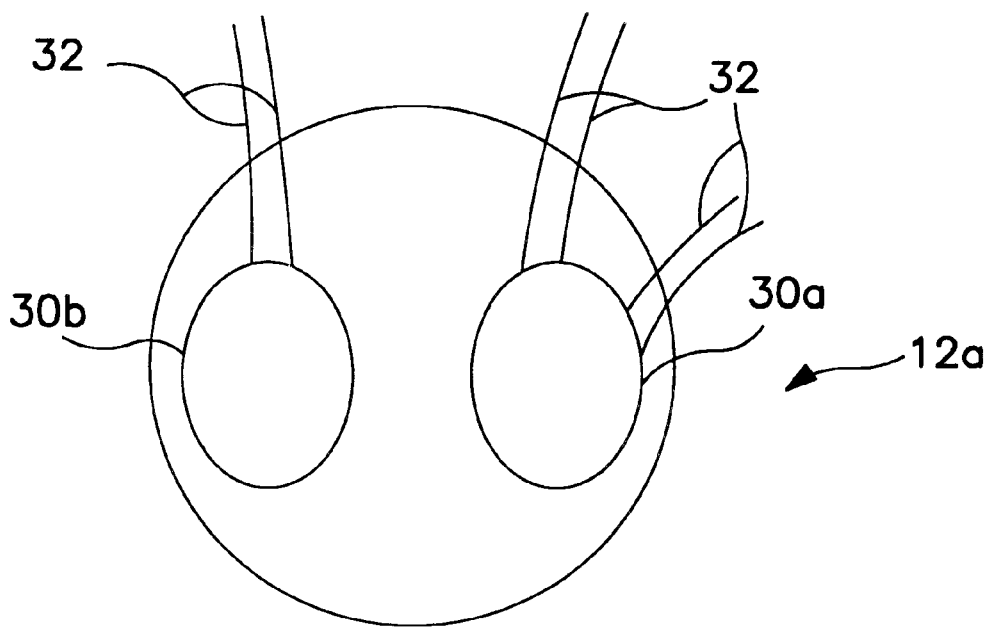
FIG. 3 is a schematic view of an alternate embodiment of a probe including dual elements for use with the system of FIG. 1.

FIGS. 2 and 3, respectively, show a first embodiment of the probe 12a and a second embodiment of the probe 12b for use with the system 10a shown in FIG. 1. The probe 12a shown in FIG. 2 comprises an element 30a configured to change temperature of the element 30a and to determine temperature of the element 30a. The probe 12b shown in FIG. 3 comprises a first element 30a configured like the first element 30a shown in FIG. 2 and a second element 30b configured to determine temperature of the environment. Preferably, the elements 30a and 30b of the probe 12b are thermally isolated from one another.

Preferably, the element 30a of the probe 12a and the elements 30a and 30b of the probe 12b include electrically resistive material having an electrical resistance proportional to the temperature of the elements 30a, 30b, so that the elements 30a, 30b are capable of determining temperature when provided with a low level electrical input (i.e., current). Additionally, the electrically resistive material is preferably capable of increasing temperature when provided with a higher level electrical input (i.e., current). In a preferred embodiment, each of the elements 30a, 30b is a silicon diode.

The element 30a may additionally include thermoelectric material capable of increasing or decreasing temperature when provided with electrical input (i.e., current). For example, the element 30a could be formed of at least one thermoelectric material such as n-type and/or p-type semiconductors that can increase or decrease temperature, depending on the direction of the electric current provided to the material.

The probes 12a, 12b preferably have a substrate surrounding the elements 30a, 30b. Preferably, the substrate is a material which is non-toxic and capable of withstanding cryogenic temperatures. For example, the substrate may include epoxy, PTFE, HDPE, and polyamide.

Figure 3A:
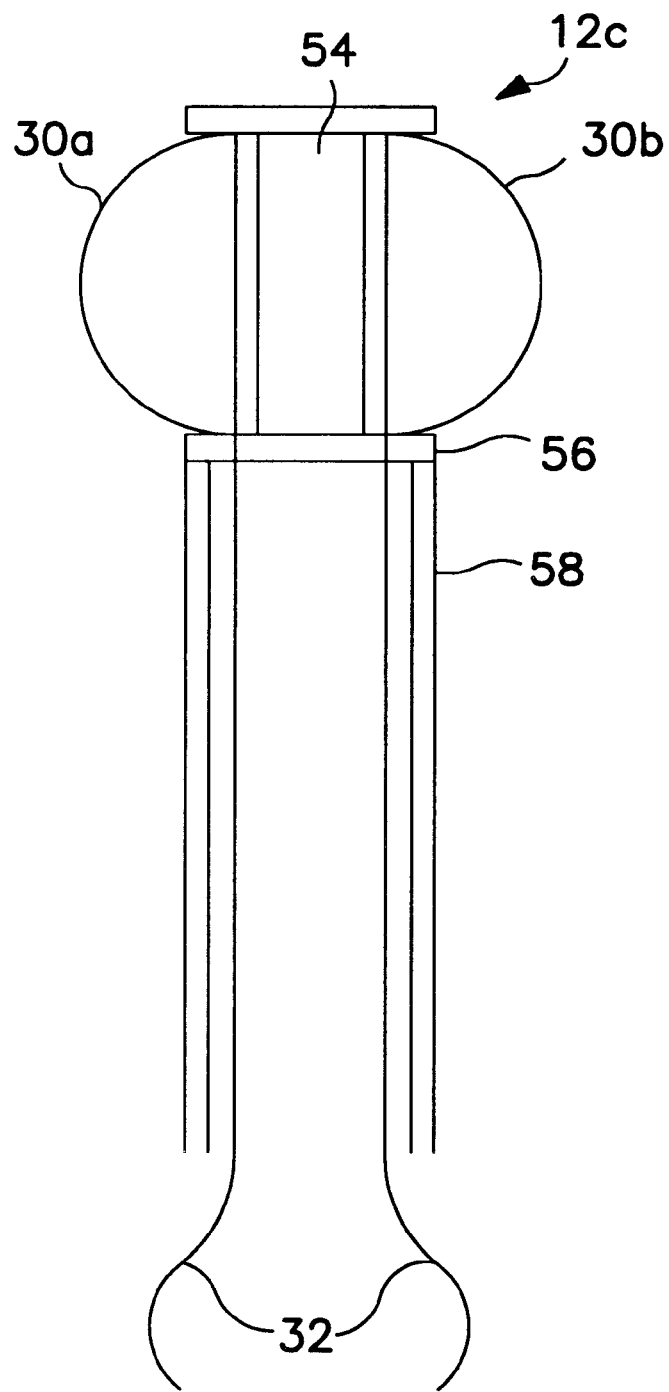
FIG. 3a is a schematic view of an alternate embodiment of a probe including dual elements for use with the system of FIG. 1.

In an alternate embodiment shown in FIG. 3a, a probe 12c includes the first and second elements 30a, 30b of the probe 12b shown in FIG. 3 attached to an end 56 of a support 58. Preferably, there is an air-filled space 54 between the elements 30a, 30b insulating the elements 30a, 30b from one another. The support 58 is preferably a tube made of polyamide. Preferably, the first and second elements 30a, 30b are in the shape of a semi-circle having a diameter of approximately 1.5 mm. The first and second elements 30a, 30b are preferably attached to the polyamide tube and one another with an epoxy glue. Preferably, the probe 12c is capable of withstanding cryogenic temperatures.

As shown in FIGS. 2 and 3, one or more electrical leads 32 extend from the probes 12a, 12b. The electrical leads 32 provide electrical connection with the elements 30a, 30b of the probes 12a, 12b. In a preferred embodiment, the element 30a of the probes 12a, 12b has four electrical leads 32, and the element 30b of the probe 12b has two electrical leads 32. With respect to the element 30a, two of the electrical leads 32 provide electrical connection to change temperature of the element 30a and two of the electrical leads 32 provide electrical connection to determine temperature of the element 30a. For element 30b shown in FIG. 3, two leads 32 provide electrical connection to determine temperature of the environment. Although the element 30a preferably includes four electrical leads 32 and the element 30b preferably includes two electrical leads, one of ordinary skill in the art will appreciate that any number of electrical leads could be used. For example, the probes 12a, 12b could have two electrical leads 32 electrically connected with the element 30a.

As shown in FIG. 1, the first power supply 14 of the system 10a provides electrical power to the element 30a of the probes 12a, 12b and to the element 30b of the probe 12b for determining temperature of the elements 30a, 30b. Preferably, a second power supply 16 provides electrical power to the element 30a for changing temperature of the element 30a. Although the invention is shown having two separate power supplies 14, 16 for supplying power to the element 30a, the invention could be practiced using only a single power supply.

The amplifier 18 shown in FIG. 1 amplifies temperature signals received from the probes 12a, 12b. Because the resistivity of the element 30a is proportional to temperature, the amplifier 18 receives voltage signals from the element 30a proportional to temperature and emits signals proportional to temperature. In a preferred embodiment for use with the probe 12b, the amplifier 18 is a differential amplifier that receives voltage signals from both of the elements 30a and 30b, and emits signals proportional to temperature difference between the elements 30a and 30b.

As shown in FIG. 1 the temperature monitor 20 receives amplified temperature signals from the amplifier 18 and determines whether temperature of the element 30a corresponds to a first predetermined temperature or a second predetermined temperature. For example, the temperature monitor 20 is a differential amplifier. Preferably, the temperature monitor 20 emits a first signal when temperature of the element 30a corresponds to the first predetermined temperature, and a second signal when temperature of the element 30a corresponds to a second predetermined temperature.

When the amplifier 18 is a differential amplifier that emits signals proportional to temperature difference between the elements 30a and 30b, the temperature monitor 20 emits a first signal when temperature difference between the elements 30a and 30b corresponds to a first predetermined temperature difference, and a second signal when temperature difference between the elements 30a and 30b corresponds to a second predetermined temperature difference.

The timing structure 22 shown in FIG. 1 measures the time elapsed from when the element 30a reaches the first predetermined temperature to when the element 30a reaches the second predetermined temperature. The timing structure 22 receives signals from the temperature monitor 20 and measures the time from when the timing structure 22 receives the first signal from the temperature monitor 20 to when the timing structure 22 receives the second signal from the temperature monitor 20. Preferably, the timing structure 22 includes a digital counter and a digital-to-analog convertor. The digital counter receives signals from the temperature monitor 20 and provides signals to the digital-to-analog convertor. Additionally, the timing structure 22 may include other components.

As shown in FIG. 1, the system controller 24 controls the second power supply 16 and the timing structure 22. The system controller 24 provides signals to the second power supply 16, thereby controlling when the power supply 16 provides electric power to the element 30a. Further, the system controller 24 receives signals from the timing structure 22 and provides signals to the timing structure 22 to control the measurement of time by the timing structure 22. Preferably, the system controller 24 includes a digital computer capable of calculating heat transfer after receiving signals from the timing structure 22 corresponding to the measured time. The system controller 24 may also control the amplifier 18 to prevent the amplifier 18 from operating out-of-range while the second power supply 16 is providing electric power to the element 30a.

Figure 4:
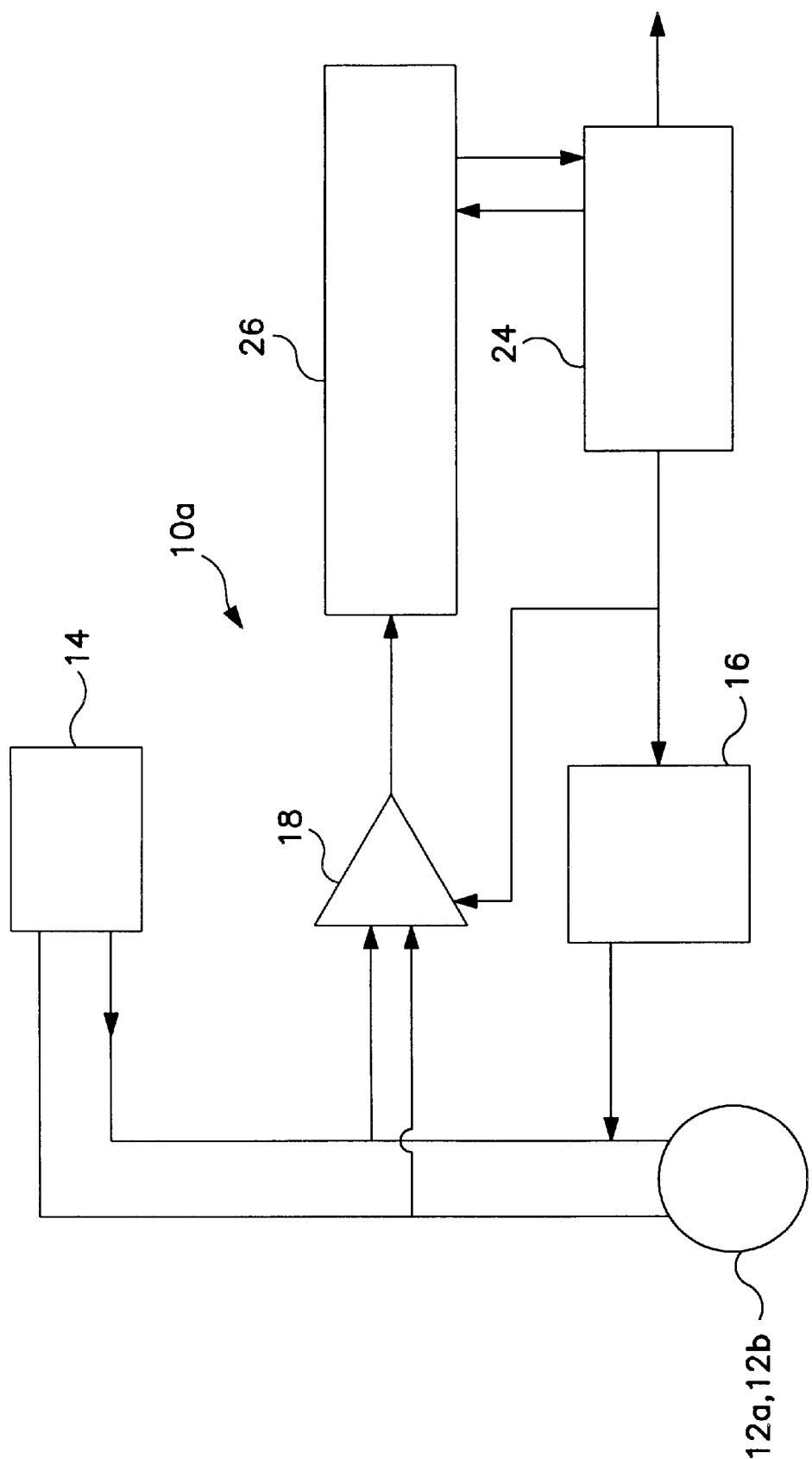
FIG. 4 is a schematic view of a second embodiment of a system for determining heat transfer in an environment.

FIG. 4 shows a second embodiment of a system 10b for determining heat transfer in an environment. Preferably, the system 10b of FIG. 4 is constructed similar to the system 10a of FIG. 1 and could be used with either one of the probes 12a or 12b. Rather than having the temperature monitor 20 and timing structure 22 shown in FIG. 1, the system 10b of FIG. 4 includes a temperature sampler 26 for measuring temperature of the element 30a at the beginning and end of a predetermined time. The temperature sampler 26 receives amplified temperature signals from the amplifier 18. In addition, the temperature sampler 26 provides signals to and receives signals from the system controller 24. The system controller 24 controls when the temperature sampler 26 samples temperatures from the amplifier 18.

In a preferred embodiment, the temperature sampler 26 includes a sample-and-hold amplifier and a voltmeter. In this embodiment, the system controller 24 controls the sample-and-hold amplifier by signaling the sample-and-hold amplifier to determine temperature from the amplifier 18 at the beginning and the end of a predetermined time. Additionally, the voltmeter receives signals from the sample-and-hold amplifier. At the beginning and the end of a predetermined time, the voltmeter provides signals to the system controller 24, proportional to temperature of the element 30a.

In the system 10b shown in FIG. 4, the system controller 24 preferably includes a digital computer capable of calculating heat transfer after receiving signals from the temperature sampler 26 corresponding to the temperature of the element 30a at both the beginning and the end of the predetermined time.

Methods of determining heat transfer in an environment with a probe including at least one element are discussed below, with reference to FIGS. 1–4. Although the invention is described in connection with the structure shown in these figures, it should be understood that the invention in its broadest sense is not so limited.

When the system of FIG. 1 and the probe 12a shown in FIG. 2 are used to determine heat transfer in an environment, the probe 12a is initially placed in the environment. Temperature of the environment is determined using the element 30a of the probe 12a. In particular, to determine temperature of the environment, the power supply 14 provides a predetermined electric current to the element 30a, resulting in a voltage drop across the element 30a proportional to temperature of the element 30a. The amplifier 18 receives the voltage signal from the element 30a and provides an amplified voltage signal to the temperature monitor 20. Based on the amplified voltage signal received from the amplifier 18, and assuming temperature of element 30a and temperature of the environment are initially the same, the temperature monitor 20 calculates the temperature of the environment.

After the temperature of the environment is determined, the temperature of the element 30a is changed by providing the element 30a with electrical input (i.e., current) from the second power supply 16, so that the element 30a reaches a first predetermined temperature different from the temperature of the environment. For example, when the element 30a has electrically resistive material and/or thermoelectric material configured to heat in response to electric power, the electrical input (i.e., current) from the second power supply 16 raises the temperature of the element 30a to a first predetermined temperature above the environmental temperature (e.g., 7° C.). Conversely, when the element 30a has thermoelectric material configured to cool in response to electrical input, the temperature of the element 30a is lowered to a first predetermined temperature below the temperature of the environment.

Next, using the same procedure as describe above for determining temperature of the environment, the temperature monitor 20 senses the first predetermined temperature of the element 30a. After the first predetermined temperature of the element 30a is sensed, the system controller 24 signals the second power supply 16 to remove the electrical input provided to the element 30a. In the absence of this electrical input, the temperature of the element 30a equilibrates (i.e., falls or rises) toward the temperature of the environment. During this equilibration, the temperature monitor 20 senses a second predetermined temperature of the element 30a, between the first predetermined temperature and temperature of the environment. This second predetermined temperature is sensed using a procedure similar to the procedure for sensing the first predetermined temperature of the element 30a.

In response to signals from the system controller 24, the timing structure 22 measures the time elapsed from the sensing of the first predetermined temperature to the sensing of the second predetermined temperature. In particular, the system controller 24 signals the timing structure 22 when the temperature monitor 20 senses the first predetermined temperature of the element 30a and also signals the timing structure 22 when the temperature monitor 20 senses the second predetermined temperature of the element 30a. The timing structure 22 calculates the time elapsed from when the system controller 24 signals the sensing of the first predetermined temperature to when the system controller 24 signals the sensing of the second predetermined temperature. Thereafter, the system controller 24 calculates heat transfer based on the first predetermined temperature, the second predetermined temperature, temperature of the environment, and the measured time. The system controller 24 calculates heat transfer based on the following equation:

$$h(t, T) = -\frac{mC_p}{At} \ln\left[\frac{T_2 - T_e}{T_1 - T_e}\right], \text{ wherein:}$$

$h$ ≡ heat transfer coefficient $\left(\frac{W}{m^2 K}\right)$ $T_e$ ≡ Temperature of environment (° C.)

$T_1$ ≡ First predetermined temperature (° C.)

$T_2$ ≡ Second predetermined temperature (° C.)

$m$ ≡ mass of the probe (kg)

$t$ ≡ measured time (seconds)

$A$ ≡ Surface area of the probe (m²)

$C_p$ ≡ Specific heat of the probe $\left(\frac{J}{kgK}\right)$.

Preferably, when calculating heat transfer using this equation, it is assumed that specific heats of the probes 12a, 12b are predetermined and constant, the probes 12a, 12b are at a uniform temperature, and the probes 12a, 12b may be treated as a lumped mass.

When the probe 12b of FIG. 3 is used in combination with the system 10a of FIG. 1, heat transfer is preferably determined in a similar manner. Rather than measuring temperature of the environment at the beginning of the process with the element 30a, the temperature monitor 20 measures a first temperature of the environment from the element 30b approximately when the first predetermined temperature is sensed and also measures a second temperature of the environment from the element 30b approximately when the second predetermined temperature is sensed. Measuring the first and second temperatures of the environment with the element 30b of the probe 12b allows the heat transfer in the environment to be calculated based on these first and second temperatures of the environment, thereby taking into account possible temperature changes in the environment. In contrast, when the temperature of the environment is measured with the element 30a alone, it is assumed that temperature of the environment remains constant throughout the measurement process over time (t), and the heat transfer in the environment is calculated based on a constant temperature of the environment.

When the system of FIG. 4 and the probe 12a shown in FIG. 2 are used to determine heat transfer in an environment, the temperature of the environment is determined using the element 30a of the probe 12a and the temperature sampler 26, rather than the temperature monitor 20 employed in the method using the system of FIG. 1. Similar to the method using the system of FIG. 1, the initial temperature of the element 30a of the probe 12a is assumed to be the same as the temperature of the environment. The power supply 14 provides a predetermined electric current to the element 30a, resulting in a voltage drop across the element 30a proportional to temperature of the element 30a. The amplifier 18 receives voltage signals from the element 30a and provides amplified voltage signals to the temperature sampler 26. Upon receiving signals from the system controller 24, the temperature sampler 26 calculates temperature of the environment based on the amplified voltage signals from the amplifier 18.

After the temperature of the environment is determined, the temperature of the element 30a is changed by providing the element 30a with electrical input from the second power supply 16, so that the difference between the temperature of the element 30a and the temperature of the environment is increased. However, unlike the method using the system of FIG. 1, the changed temperature of the element 30a is not necessarily predetermined. After the changing of the temperature of the element 30a, the system controller 24 signals the temperature sampler 26 to determine a first temperature of the element 30a using the same procedure employed to determine the temperature of the environment. Next, the system controller 24 signals the second power supply 16 to remove the electrical input. After the removing of the electrical input, the system controller 24 allows the temperature of the element 30a to equilibrate toward the temperature of the environment for a predetermined period of time.

After the predetermined period of time has passed, the system controller 24 signals the temperature sampler 26 to measure a second temperature of the element 30a using the same method employed to measure the first temperature. Thereafter, the system controller 24 calculates the heat transfer in the environment based on the first temperature, the second temperature, temperature of the environment, and the predetermined period of time. The system controller 24 calculates the heat transfer based on an equation similar to the equation above, wherein "$T_1$" is the first determined temperature, "$T_2$" is the second measured temperature, and "t" is the predetermined period of time.

When the probe of 12b is used in combination with the system of FIG. 4, the heat transfer is determined in a similar manner. Instead of measuring the temperature of the environment at the beginning of the process with the element 30a, the system controller 24 signals the temperature sampler 26 to measure a first temperature of the environment from the element 30b approximately when the first temperature of the element 30a is determined and a second temperature of the environment from the element 30b approximately when the second temperature of the element 30a is measured. Calculating the heat transfer with the first and second temperatures of the environment takes into account changes in the temperature of the environment during the process.

Figure 5:
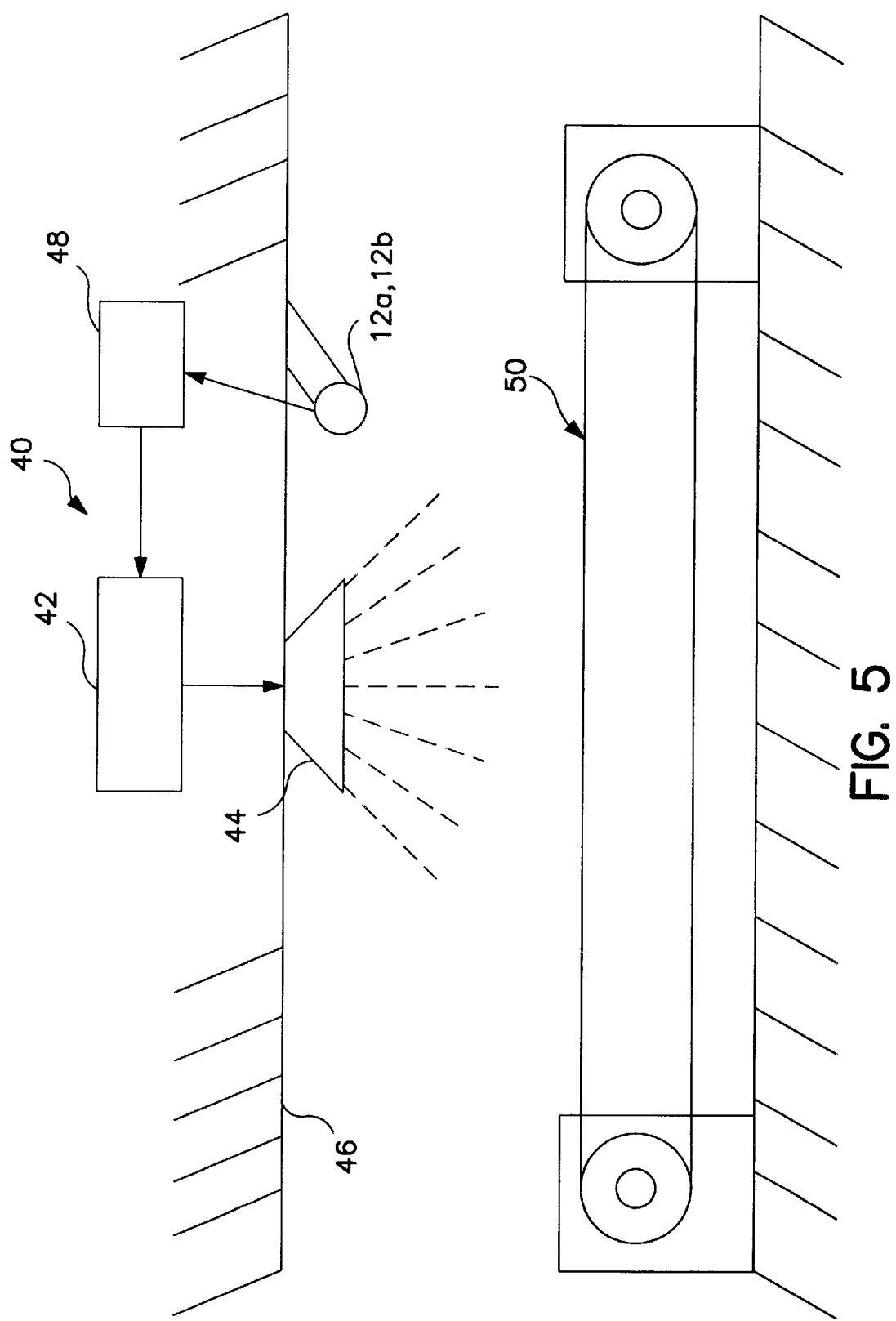
FIG. 5 is a schematic view of an embodiment of a system for controlling the heat transfer rate in a climate controlled environment.

FIG. 5 shows an additional embodiment of the invention, including a system 40 for controlling the heat transfer rate in a climate controlled environment. The system 40 includes at least one wall 46 forming at least a partially closed environment in which the probe 12a, 12b is positioned, a climate control sub-system 44, a heat transfer rate determining sub-system 48, and a climate controller 42. The climate control sub-system 44 is provided for changing temperature in the environment. In a preferred embodiment, the climate control sub-system 44 is configured to release cryogenic fluid in the environment to reduce temperature in the environment. For example, the climate control sub-system 44 could release liquid nitrogen, or other cryogenic fluids to cool the environment. In the alternative, the climate control sub-system 44 is configured to heat the environment. For example, the climate control sub-system 44 could provide heated air or other suitable fluids to heat the environment. Preferably, the climate control sub-system 44 is used to freeze, cool and/or heat food products.

The heat transfer rate determining sub-system 48 is provided for determining heat transfer rate in the environment. Preferably, the heat transfer rate determining sub-system 48 includes the system 10a shown in FIG. 1 or the system 10b shown in FIG. 4 for determining heat transfer in the environment. The heat transfer rate determining sub-system 48 provides signals to the climate controller 42.

The climate controller 42 is provided for controlling the climate control sub-system 44 and for receiving heat transfer rate signals from the heat transfer rate determining sub-system 48. Preferably, the climate controller 42 could be programmed to provide a predetermined heat transfer rate profile in the environment. In the preferred embodiment, the climate controller 42 compares the programmed heat transfer rate profile to the signals received from the heat transfer rate determining sub-system 48, and signals the climate control sub-system 44 to alter the temperature of the environment to increase or decrease the rate of heat transfer, so that the heat transfer rate in the environment matches the programmed heat transfer rate profile. Preferably, the climate controller 42 includes a digital computer.

Optionally, a conveyor 50 is provided for moving different items through the system 40. Preferably, the conveyor 50 moves food products through the system 40, thereby freezing, cooling, or heating the food products as the food products move along the conveyor 50. The conveyor 50 may also be controlled by the climate controller 42 to change speed in accordance with the programmed heat transfer rate profile.

It will be apparent to those skilled in the art that various modifications and variations can be made to the structure and methodology of the present invention without departing from the scope or spirit of the invention. In view of the foregoing, it is intended that the present invention cover modifications and variations of this invention provided they fall within the scope of the following claims and their equivalents.

What is claimed is:

1. A method of determining heat transfer in an environment with a probe including at least one element, comprising:

determining temperature of the environment;
   changing temperature of the element to increase the difference between temperature of the element and temperature of the environment;
   determining a first temperature of the element after the changing of the temperature of the element;
   allowing the element to equilibrate for a predetermined period of time toward temperature of the environment;
   measuring a second temperature of the element when the predetermined period of time has passed; and
   calculating heat transfer in the environment based on the first temperature, the second temperature, temperature of the environment, and the predetermined period of time.

2. The method of claim 1, wherein the changing of the temperature of the element includes heating the element.

3. The method of claim 2, wherein the heating of the element further includes providing electrical input to at least one of electrically resistive material and thermoelectric material to increase temperature of the element.

4. The method of claim 1, wherein the calculating of heat transfer additionally comprises calculating the heat transfer based on a uniform temperature for the probe, lumped mass for the probe, and a predetermined, constant, specific heat for the probe.

5. The method of claim 1, wherein the changing of the temperature of the element includes cooling the element.

6. The method of claim 5, wherein the cooling of the element includes providing electrical input to thermoelectric material to decrease temperature of the element.

7. The method of claim 1, wherein the determining of the first temperature and the measuring of the second temperature additionally comprise:

providing a predetermined electric current to the element;
   measuring voltage drop across the element; and
   calculating the first temperature and the second temperature based on the voltage drop across the element.

8. The method of claim 1, wherein the probe includes one element, wherein the changing of the temperature of the element includes providing electrical input to the element, wherein the determining of the first temperature of the element includes providing electrical input to the element, wherein the measuring of the second temperature of the element includes providing electrical input to the element, and wherein the heat transfer is calculated based on constant environment temperature.

9. The method of claim 1, wherein the probe includes a first element and a second element, wherein the changing of temperature includes providing electrical input to the first element to increase the difference between temperature of the first element and temperature of the environment, wherein the determining of the first temperature includes providing electrical input to the first element, wherein the method further comprises determining a first temperature of the environment by providing electrical input to the second element, wherein the step of allowing includes allowing the first element to equilibrate for a predetermined period of time toward temperature of the environment, wherein the measuring of the second temperature includes providing electrical input to the first element when the predetermined period of time has passed, wherein the method further comprises measuring a second temperature of the environment by providing electrical input to the second element, and wherein the heat transfer is calculated based on the first and second temperatures of the environment.

10. A method of determining heat transfer in an environment with a probe including at least one element, comprising:

determining temperature of the environment;
   changing temperature of the element so that the element reaches a first predetermined temperature different from temperature of the environment;

sensing the first predetermined temperature of the element;

allowing the temperature of the element to equilibrate toward temperature of the environment;

sensing a second predetermined temperature of the element between the first predetermined temperature and temperature of the environment;

measuring the time elapsed from the sensing of the first predetermined temperature to the sensing of the second predetermined temperature; and calculating heat transfer in the environment based on the first predetermined temperature, the second predetermined temperature, temperature of the environment, and the measured time.

11. The method of claim 10, wherein the changing of the temperature of the element includes heating the element.

12. The method of claim 10, wherein the heating of the element further includes providing electrical input to at least one of electrically resistive material and thermoelectric material to increase temperature of the element.

13. The method of claim 10, wherein the calculating of heat transfer additionally comprises calculating the heat transfer based on a predetermined uniform temperature for the probe, lumped mass for the probe, and a predetermined, constant, specific heat for the probe.

14. The method of claim 10, wherein the changing of the temperature of the element includes cooling the element.

15. The method of claim 14, wherein the cooling of the element further includes providing electrical input to thermoelectric material to decrease temperature of the element.

16. The method of claim 10, wherein the sensing of the first predetermined temperature and the sensing of the second predetermined temperature additionally comprise:

providing a predetermined electric current to the element;

measuring voltage drop across the element; and calculating the first temperature and the second temperature based on the voltage drop across the element.

17. The method of claim 10, wherein the measuring of the elapsed time comprises:

inputting a first voltage signal to a timing structure when the element reaches the first predetermined temperature;

inputting a second voltage signal to the timing structure when the element reaches the second predetermined temperature; and calculating the measured time with the timing structure.

18. The method of claim 17, wherein the sensing of the first and second predetermined temperatures includes performing the sensing with a temperature monitor, wherein the temperature monitor inputs the first voltage signal to the timing structure when the element reaches the first predetermined temperature and the temperature monitor inputs the second voltage signal to the timing structure when the element reaches the second predetermined temperature.

19. The method of claim 10, wherein the probe includes one element, wherein the changing of the temperature of the element includes providing electrical input to the element, wherein the sensing of the first predetermined temperature of the element includes providing electrical input to the element, wherein the sensing of the second predetermined temperature of the element includes providing electrical input to the element, and wherein the heat transfer is calculated based on constant environment temperature.

20. The method of claim 10, wherein the probe includes a first element and a second element, wherein the changing of the temperature includes providing electrical input to the first element to increase the difference between temperature of the first element and temperature of the environment, wherein the sensing of the first predetermined temperature includes providing electrical input to the first element, wherein the method further comprises determining a first temperature of the environment by providing electrical input to the second element, wherein the step of allowing includes allowing the first element to equilibrate toward the temperature of the environment, wherein the sensing of the second predetermined temperature includes providing electrical input to the first element, wherein the method further comprises measuring a second temperature of the environment by providing electrical input to the second element, wherein the measuring of the time elapsed includes measuring the time elapsed from the sensing of the first predetermined temperature of the first element to the sensing of the second predetermined temperature of the first element, and wherein the heat transfer is calculated based on the first and second temperatures of the environment.

21. A system for determining heat transfer in an environment, comprising:

a probe including at least one element, the at least one element being configured to change temperature of the element and to determine temperature of the element;

at least one pair of electrical leads extending from the probe;

at least one power supply for providing electrical power to the element;

an amplifier for amplifying temperature signals received from the element;

a temperature monitor for receiving amplified temperature signals from the amplifier and for determining whether the temperature of the element corresponds to a first predetermined temperature or a second predetermined temperature;

a timing structure for measuring time elapsed from when the element reaches the first predetermined temperature to when the element reaches the second predetermined temperature; and a system controller for controlling the power supply and the timing structure, the system controller receiving signals from the timing structure, and providing signals to the timing structure and the power supply.

22. The system of claim 21, wherein the probe comprises one element, the element being configured to change temperature of the element and to determine temperature of the element.

23. The system of claim 21, wherein the probe comprises a first element and a second element, the first element being configured to change temperature of the first element and to determine temperature of the first element, and the second element being configured to measure temperature of the environment.

24. The system of claim 21, wherein the element comprises at least one of electrically resistive material capable of increasing temperature when provided with electrical input and thermoelectric material capable of increasing or decreasing temperature when provided with electrical input.

25. The system of claim 21, wherein the element comprises a silicon diode.

26. The system of claim 21, wherein the probe comprises a substrate surrounding the element.

27. The system of claim 26, wherein the substrate is chosen from epoxy, polyamide, and PTFE.

28. The system of claim 23, wherein the first element is thermally isolated from the second element.

29. The system of claim 28, wherein the first element and the second element are on a tube.

30. The system of claim 29, wherein the tube is manufactured of non-toxic polyamide material, the polyamide being capable of withstanding cryogenic temperatures.

31. The system of claim 21, wherein the timing structure includes a digital counter and a digital-to-analog converter, the digital counter receiving signals from the temperature monitor and providing signals to the digital-to-analog converter.

32. The system of claim 21, wherein the power supply comprises a first power supply for supplying power to the element for determining temperature of the element and a second power supply for supplying power to the element for changing temperature of the element.

33. The system of claim 23, wherein the amplifier comprises a differential amplifier, the differential amplifier receiving temperature signals from the first element, receiving temperature signals from the second element, and emitting signals proportional to the temperature difference between the first element and the second element.

34. The system of claim 21, wherein the temperature monitor includes a differential amplifier.

35. The system of claim 21, wherein the system controller controls the amplifier.

36. A system for controlling the heat transfer rate in a climate controlled environment, comprising:
    at least one wall forming at least a partially closed environment;
    a climate control sub-system for changing temperature in the environment;
    a heat transfer rate determining sub-system for determining heat transfer rate in the environment, the heat transfer rate determining sub-system including the system of claim 21; and
    a climate controller for controlling the climate control sub-system, the climate controller receiving input from the heat transfer rate determining sub-system.

37. The system of claim 36, wherein the climate control sub-system is configured to release cryogenic fluid in the environment to reduce temperature in the environment.

38. The system of claim 36, wherein the climate control sub-system is configured to heat the environment.

39. The system of claim 36, wherein the climate controller is configured to provide a predetermined heat transfer profile in the environment.

40. A system for determining heat transfer in an environment, comprising:
    a probe including at least one element, the at least one element being configured to change temperature of the element and to determine temperature of the element;
    at least one electrical lead pair extending from the probe;
    at least one power supply for providing electrical power to the element;
    an amplifier for amplifying temperature signals received from the element;
    a temperature sampler for receiving amplified temperature signals from the amplifier and for measuring the temperature of the element at the beginning and the end of a predetermined period of time;
    a system controller for controlling the power supply and the temperature sampler, the system controller providing signals to the power supply and the temperature sampler and receiving signals from the temperature sampler.

41. The system of claim 40, wherein the probe comprises one element, the element being configured to change temperature of the element and to determine temperature of the element.

42. The system of claim 40, wherein the probe comprises a first element and a second element, the first element being configured to change temperature of the first element and to determine temperature of the first element, and the second element being configured to measure temperature of the environment.

43. The system of claim 40, wherein the element comprises at least one of electrically resistive material capable of increasing temperature when provided with electrical input and thermoelectric material capable of increasing or decreasing temperature when provided with electrical input.

44. The system of claim 40, wherein the element comprises a silicon diode.

45. The system of claim 40, wherein the probe comprises a substrate surrounding the element.

46. The system of claim 40, wherein the substrate is chosen from epoxy, polyamide, and PTFE.

47. The system of claim 42, wherein the first element is thermally isolated from the second element.

48. The system of claim 47, wherein the first element and the second element are on a tube.

49. The system of claim 48, wherein the tube is manufactured of non-toxic polyamide material, the polyamide being capable of withstanding cryogenic temperatures.

50. The system of claim 40, wherein the temperature sampler includes a sample-and-hold amplifier and a voltmeter.

51. The system of claim 40, wherein the power supply comprises a first power supply for supplying power to the element for determining temperature of the element and a second power supply for supplying power to the element for changing temperature of the element.

52. The system of claim 42, wherein the amplifier comprises a differential amplifier, the differential amplifier receiving temperature signals from the first element, receiving temperature signals from the second element, and emitting signals proportional to the difference between the first element and the second element.

53. The system of claim 40, wherein the system controller controls the amplifier.

54. A system for controlling the heat transfer rate in a climate controlled environment, comprising:
    at least one wall forming at least a partially closed environment;
    a climate control sub-system for changing temperature in the environment;
    a heat transfer rate determining sub-system for determining heat transfer rate in the environment, the heat transfer rate determining sub-system including the system of claim 36; and
    a climate controller for controlling the climate control sub-system, the climate controller receiving input from the heat transfer rate determining sub-system.

55. The system of claim 54, wherein the climate control sub-system is configured to release cryogenic fluid in the environment to reduce temperature in the environment.

56. The system of claim 54, wherein the climate control sub-system is configured to heat the environment.

57. The system of claim 54, wherein the climate controller is configured to provide a predetermined heat transfer profile in the environment.

* * * * *